(12) United States Patent
Yu

(10) Patent No.: US 12,431,947 B2
(45) Date of Patent: Sep. 30, 2025

(54) BEAM STEERING METHOD AND DEVICE USING FREQUENCY MODULATION AND PHASE SHIFT

(71) Applicant: KOREA ASTRONOMY AND SPACE SCIENCE INSTITUTE, Daejeon (KR)

(72) Inventor: Jiwoong Yu, Sejong-si (KR)

(73) Assignee: KOREA ASTRONOMY AND SPACE SCIENCE INSTITUTE, Daejeon (KR)

( * ) Notice: Subject to any disclaimer, the term of this patent is extended or adjusted under 35 U.S.C. 154(b) by 30 days.

(21) Appl. No.: 18/507,691

(22) Filed: Feb. 8, 2024

(65) Prior Publication Data

US 2024/0178890 A1    May 30, 2024

(51) Int. Cl.
  *H04L 5/12*     (2006.01)
  *H04B 7/0426*   (2017.01)
  *H04B 7/06*     (2006.01)

(52) U.S. Cl.
  CPC ......... *H04B 7/043* (2013.01); *H04B 7/06958* (2023.05)

(58) Field of Classification Search
  CPC ............................ H04B 7/043; H04B 7/06958
  USPC ................ 375/262, 260, 259, 219, 295, 316
  See application file for complete search history.

(56) References Cited

U.S. PATENT DOCUMENTS

| | | | |
|---|---|---|---|
| 7,026,989 B1 | 4/2006 | Minkoff et al. | |
| 2005/0285785 A1 | 12/2005 | Martin et al. | |
| 2013/0176173 A1 | 7/2013 | Chew et al. | |
| 2015/0282001 A1* | 10/2015 | Kwak ................. | H04B 7/0695 370/229 |
| 2015/0380832 A1 | 12/2015 | Scott et al. | |

FOREIGN PATENT DOCUMENTS

| | | |
|---|---|---|
| JP | 2003194917 A | 7/2003 |
| JP | 2008283525 A | 11/2008 |
| KR | 200406784 Y1 | 1/2006 |
| KR | 20160017974 A | 2/2016 |
| KR | 20220072189 A | 6/2022 |

OTHER PUBLICATIONS

Extended European Search Report dated Apr. 17, 2024 for corresponding EP 23209819.4 (8 pages).
First Office Action issued on Oct. 1, 2024 for corresponding JP 2023-193733. English translation provided.

* cited by examiner

*Primary Examiner* — Zewdu A Kassa
(74) *Attorney, Agent, or Firm* — The Small Patent Law Group LLC; Christopher R. Carroll

(57) ABSTRACT

The present invention relates to a beam steering device of a phased array antenna for reducing a grating lobe, and more particularly, to a beam steering device of a phased array antenna for reducing a grating lobe so that grating lobes generated when receiving a signal by rotating an array of a plurality of antenna elements at a predetermined angle during transmission do not overlap each other when receiving the signal through the beam steering device.

14 Claims, 12 Drawing Sheets

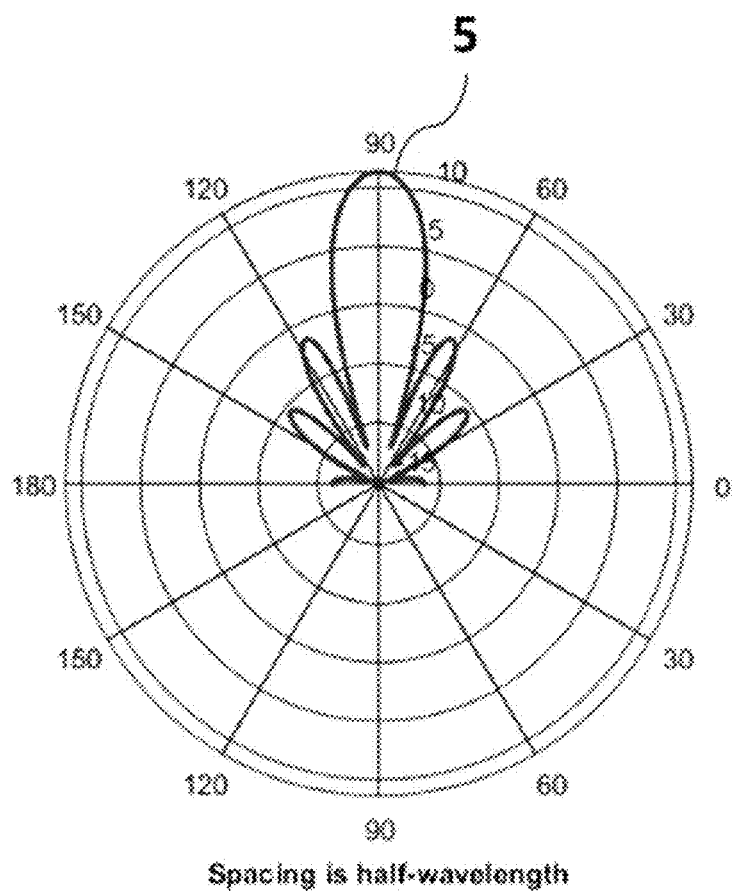

Spacing is one and half-wavelength

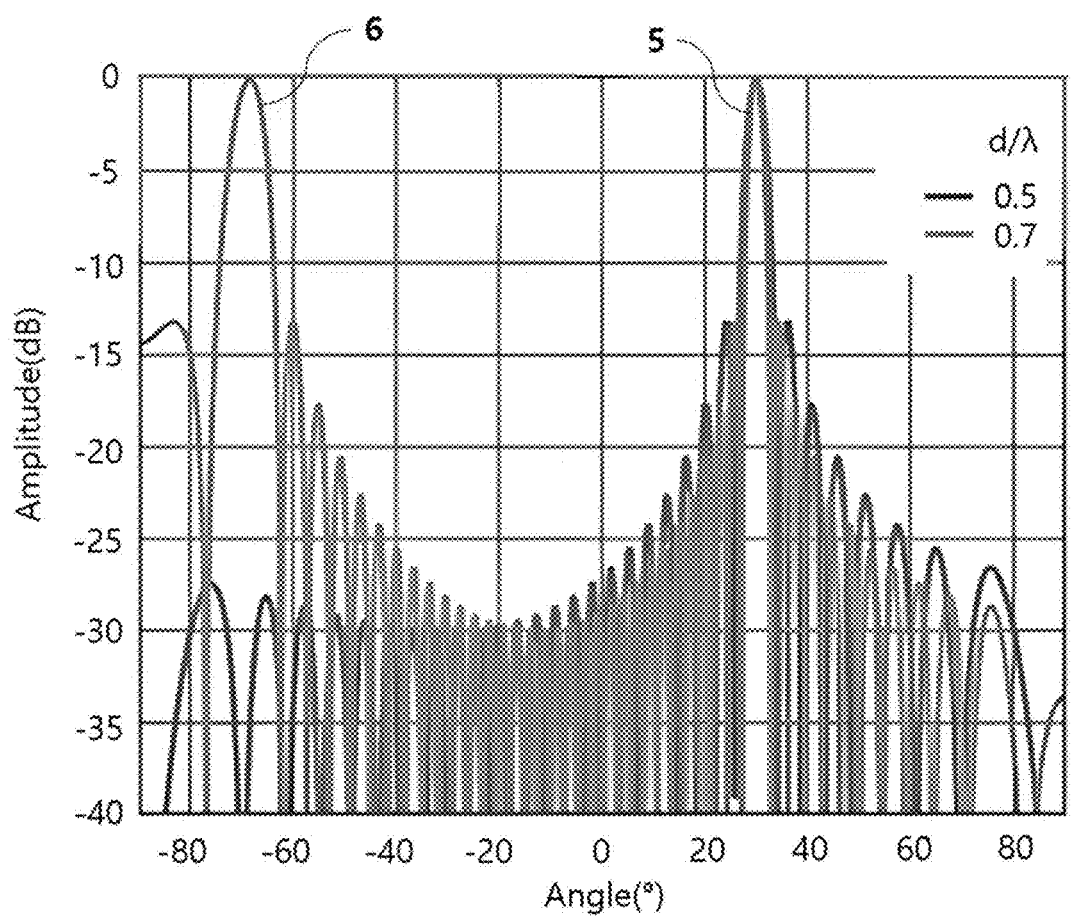

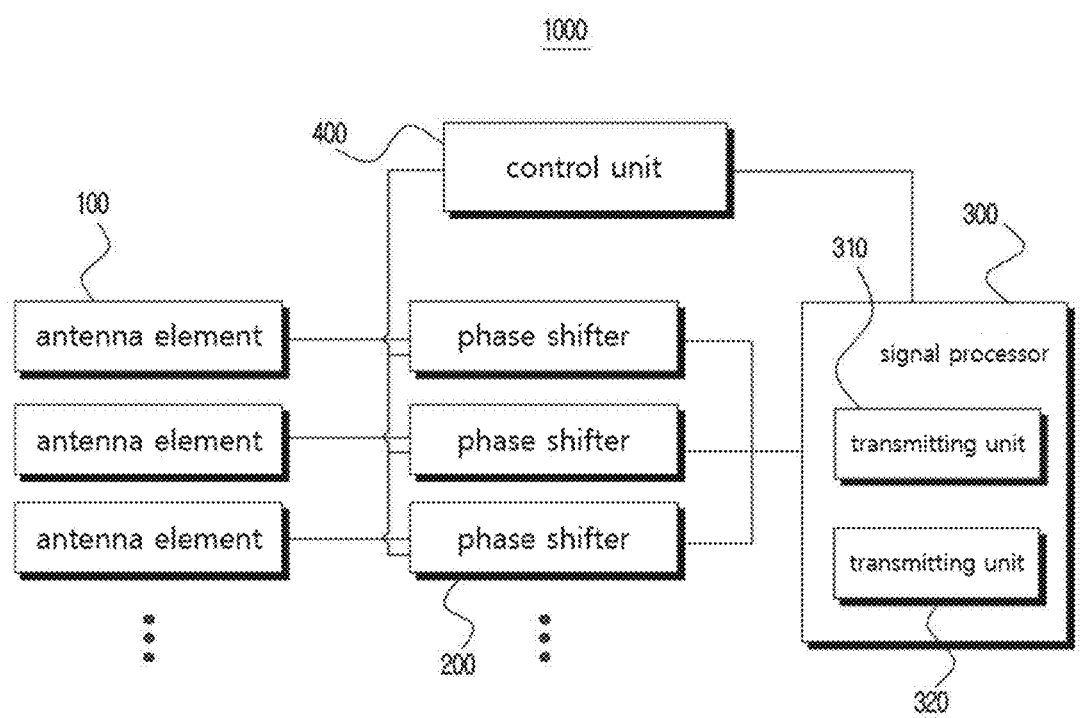

Grating lobe chart of rectangular grid array

Grating lobe chart of triangular grid array

BEAM STEERING METHOD AND DEVICE USING FREQUENCY MODULATION AND PHASE SHIFT

CROSS-REFERENCE TO RELATED APPLICATIONS

This application claims priority under 35 U.S.C. § 119 to Korean Patent Application No. 10-2022-0151504, filed on Nov. 14, 2022, in the Korean Intellectual Property Office, the disclosure of which is incorporated herein by reference in its entirety.

TECHNICAL FIELD

The following disclosure relates to a beam steering method and device using frequency modulation and phase shift, and more particularly, to a beam steering method and device using frequency modulation and phase shift so that grating lobes or side lobes generated when receiving a signal by rotating an array of a plurality of antenna elements at a predetermined angle during transmission do not overlap each other when receiving the signal through the beam steering device.

BACKGROUND

A phased array antenna uses a principle of quickly controlling a direction of a synthesized beam by arranging a plurality of antenna elements in one dimension or space and then electrically controlling phases of each element through a phase shifter that adjusts the phases of each element, and have various advantages, such as high reliability and rapid and accurate direction by controlling the phase of the antenna array regardless of mechanical drive in directing a beam.

Due to these advantages, in addition to improving a direction speed of radar beams mounted on fighter planes or ships, recently, the scope of use of the phased array antenna is gradually expanding to transmission and reception antennas for aircraft and satellite imaging radar (SAR), and relay technology for mobile communications, etc.

FIG. 1 illustrates a schematic configuration diagram of a conventional phased array antenna.

As illustrated in FIG. 1, the conventional phased array antenna includes M antenna elements 1, a phase shifter 2 that adjusts a phase of a signal input to each of the antenna elements 1, a transmitter 3 that generates and frequency up-converts an IQ signal in the form of a baseband to be transmitted to the phase shifter 2, and a controller 4 that controls the transmitter 3 and the phase shifter 2 to output a beam in a desired direction.

In addition, the antenna element 1 may receive an external signal, and the phase shifter 2 receives the received signal to adjust the phase under the control of the controller 4, and the adjusted signal is received by the receiver (not illustrated) and an IQ signal is extracted.

In the beam steering device using such a phased array antenna, when the plurality of antenna elements 1 are arranged on a two-dimensional plane, an array factor of the phased array antenna may be expressed as follows.

$$AF = \sum_{l=1}^{N,M} c_l e^{j\left[\left(\frac{2\pi}{\lambda}x_l \sin\theta\cos\phi + \frac{2\pi}{\lambda}y_l \sin\theta\sin\phi\right) - \left(\frac{2\pi}{\lambda}x_l \sin\theta_0\cos\phi_0 + \frac{2\pi}{\lambda}y_l \sin\theta_0\sin\phi_0\right)\right]}$$

Here, $x_l$ and $y_l$ indicate a position of an antenna element in x-axis and y-axis directions, $\theta$ indicates an elevation angle, $\phi$ indicates an azimuth angle. In order to steer a beam at angles $\theta$ and $\phi$, a phase shift value of the antenna element at the position of $x_l$ and $y_l$ is $$\frac{2\pi}{\lambda}x_l \sin\theta\cos\phi + \frac{2\pi}{\lambda}y_l \sin\theta\sin\phi.$$

FIGS. 2A and 2B are diagrams illustrating an example of a general beam pattern, and FIGS. 3A and 3B are diagrams illustrating an example of a beam pattern according to d/λ.

Referring to the drawings, FIGS. 2A and 2B are diagrams illustrating a beam pattern, that is, antenna directivity. FIG. 2A is a diagram illustrating a normal beam pattern in which only a main lobe 5 is formed without a grating lobe 6, and FIG. 2B is a diagram illustrating a poor beam pattern in which the grating lobes 6 are formed on both sides of the main lobe 5.

In this way, when the grating lobes 6 are generated in the beam pattern, a problem arises where the steering beam is output in an undesired direction to reduce a gain of the steering beam that should be output in the desired direction and where the beam is emitted in an undesired direction.

The grating lobes 6 are a phenomenon that occurs when a spacing between the antenna elements 1 increases, and generally, the spacing of the antenna elements does not occur below wavelength/2.

$$\begin{cases} \sin\theta_{pm}\cos\phi_{pq} = \sin\theta_0\cos\phi_0 + p\dfrac{\lambda}{d_x} \\ \sin\theta_{pm}\sin\phi_{pq} = \sin\theta_0\sin\phi_0 + q\dfrac{\lambda}{d_y} \end{cases}.$$

In addition, FIG. 3A illustrates the beam patterns for d/λ=0.5 and d/λ=0.7, and the beam patterns in which, when d/λ=0.5, the grating lobe 6 does not occur and the main lobe 5 exists at 30°, but when d/λ=0.7, the grating lobe 6 exists at approximately −70° in addition to the main lobe 5 at 30°.

In addition, when d/λ=1.5 as illustrated in FIG. 3B, the grating lobes 6 have at approximately 40° and −40° even without the beam steering.

In addition, the phased array antenna that use a broadband signal has the problem in that as the beam steering angle increases, the gain of the steering beam decreases and the beam width widens.

In addition, the size of the phased array antenna element is limited depending on the risk of occurrence of the grating lobes, which makes it impossible to take advantage of the fact that the larger the area of the antenna element, the larger the gain of the antenna and the narrower the beam width of the main lobe.

Therefore, when the size of the antenna element increases to prevent the grating lobes from being generated, there is an urgent need to develop a beam steering device capable of limiting the occurrence of grating lobes because signals may be transmitted and received farther without increasing transmission power.

RELATED ART DOCUMENT

Patent Document

Korea Registered Utility Model No. 20-0406784

SUMMARY

An embodiment of the present invention is directed to providing a beam steering method and device using frequency modulation and phase shift so that grating lobes generated when receiving a signal by rotating an array of a plurality of antenna elements at a predetermined angle during transmission do not overlap each other when receiving the signal through the beam steering device.

In addition, an embodiment of the present invention is directed to providing a beam steering method and device using frequency modulation and phase shift capable of minimizing an effect of the occurrence of grating lobes by calculating a rotation angle at which a relative distance between the grating lobes is the greatest.

The present invention has the following features to solve the above problems.

In one general aspect, a beam steering device includes: a plurality of antenna elements each that output a received signal to an outside in a predetermined beam direction and receive the signal received from the outside; a plurality of phase shifters each that are connected to the plurality of antenna elements to adjust and output a phase of the signal received by the antenna elements or receive the signal from the antenna elements to adjust and output the phase; a signal processor that generates an IQ signal of a baseband waveform and outputs the generated IQ signal to the phase shifter or extracts the IQ signal from the signal received from the phase shifter; and a control unit that controls the plurality of antenna elements, the plurality of phase shifters, and the signal processor so that the signal is output or received in a predetermined beam direction, in which the control unit sets the array of the plurality of antenna elements during transmission and the array of the plurality of antenna elements during reception to be different from each other so that a grating lobe generated during the transmission through the plurality of antenna elements and a grating lobe or a side lobe generated during the reception do not overlap each other.

When a main beam directivity angle during the transmission is $\theta_0$ and $\phi_0$, the control unit may calculate a plurality of $\theta_{pq}$ and $\phi_{pq}$, which are directivity angles of the grating lobe generated during the transmission, based on Equations (1) and (2) below, generate a first grating lobe chart by specifying a transmittable visible region, rotate the array of the plurality of antenna elements for each predetermined angle from a center during the transmission, calculate the plurality of received grating lobe directivity angles $\theta_{pq}$ and $\phi_{pq}$ with respect to the main beam directivity angles $\theta_0$ and $\phi_0$ for each predetermined angle based on Equations (1) and (2) below, generate a second grating lobe chart by specifying a receivable visible region, and calculate an angle at which a relative distance between each grating lobe in the visible region of the first grating lob chart and each grating lobe in the visible region of the second grating lob chart is the greatest.

$$\sin\theta_{pq}\cos\phi_{pq} = \sin\theta_0\cos\phi_0 + p\frac{\lambda}{d_x} \quad \text{Equation (1)}$$

$$\sin\theta_{pq}\mathrm{a}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, and λ indicates a beam wavelength)

The array of the plurality of antenna elements may be a rectangular grid array or a triangular grid array during both the transmission and reception, or during the transmission and reception, one may be the rectangular grid array and the other may be the triangular grid array.

When generating the first grating lobe chart and the second grating lobe chart, the control unit may calculate the plurality of grating lobe directivity angles $\theta_{pq}$ and $\phi_{pq}$ with respect to the beam directivity angles $\theta_0$ and $\phi_0$ of all main lobes with directivity and calculate the relative distance between the grating lobes in the visible region.

The control unit may perform a phase shift through the plurality of phase shifters with respect to the calculated beam directivity angles $\theta_0$ and $\phi_0$ of the main lobe to be output during the transmission and the beam directivity angles $\theta_0$ and $\phi_0$ of the main lobe to be received during the reception, and a time delay through the frequency modulation of the signal processor.

The signal processor may include: a transmitting unit that generates the IQ signal and transmits the generated IQ signal to the phase shifter; and a receiving unit that extracts the IQ signal from the signal received from the phase shifter, and the transmitting unit may include: an IQ signal generation unit that generates the IQ signal; a modulation signal generation unit that generates a modulation signal for modulating the frequency of the IQ signal under the control of the control unit; a carrier signal generation unit that generates a carrier signal; and a frequency modulation unit that performs the frequency modulation by combining at least two of the IQ signal, the modulation signal, and the carrier signal received under the control of the control unit.

The control unit may perform the frequency modulation through at least one of performing the frequency modulation by combining the IQ signal and the modulation signal in the frequency modulation unit, performing the frequency modulation by combining the IQ signal and the changed and generated carrier signal in the frequency modulation unit, and performing the frequency modulation by combining the IQ signal multiplied by a sinusoidal function in the frequency modulation unit and the carrier signal.

In another general aspect, a beam steering device of a phased array antenna includes: a plurality of antenna elements each that output a received signal to an outside in a predetermined beam direction and receive the signal received from the outside; a plurality of phase shifters each that are connected to the plurality of antenna elements to adjust and output a phase of the signal received by the antenna elements or receive the signal from the antenna elements to adjust and output the phase; a signal processor that generates an IQ signal of a baseband waveform and outputs the generated IQ signal to the phase shifter or extracts the IQ signal from the signal received from the phase shifter; and a control unit that controls the plurality of antenna elements, the plurality of phase shifters, and the signal processor so that the signal is output or received in a predetermined beam direction, in which the control unit sets a beam directivity direction of a main lobe output during transmission and the beam directivity direction of the main lobe during reception to be different from each other through a physical rotation so that a grating lobe generated during the transmission through the plurality of antenna elements and a grating lobe generated during the reception do not overlap each other.

When the plurality of antenna elements are a rectangular grid array, during the transmission, the control unit may display the plurality of generated grating lobe directivity angles θpq and ϕpq on a grating lobe chart when a beam directivity angle of the main lobe output is θ0 and ϕ0, and select specific grating lobe positions p and q among the grating lobes displayed on the grating lobe chart to calculate a beam directivity angle of the main lobe to be finally output based on equations (1) and (2) below, and during the reception, may select the grating lobe positions p and q during the transmission and grating lobe positions −p and −q opposing thereto based on an origin of the grating lobe chart to calculate a beam directivity angle of the main lobe to be finally received based on the Equations (1) and (2) below.

$$\sin\theta_{pq}\cos\phi_{pq} = \sin\theta_0\cos\phi_0 + p\frac{\lambda}{d_x} \quad \text{Equation (1)}$$

$$\sin\theta_{pq}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, λ indicates a beam wavelength)

When the plurality of antenna elements are a triangular grid array, during the transmission, the control unit may display the plurality of generated grating lobe directivity angles $\theta_{pq}$ and $\phi_{pq}$ on a grating lobe chart when a beam directivity angle of the main lobe output is $\theta_0$ and $\phi_0$, and select specific grating lobe positions p and q (here, any one of p or q is 0) among the grating lobes displayed on the grating lobe chart to calculate a beam directivity angle of the main lobe to be finally output based on equations (1) and (2) below, and during the reception, select the grating lobe positions during the transmission and grating lobe positions −p and −q (here, any one of p or q is 0) opposing thereto based on an origin of the grating lobe chart to calculate a beam directivity angle of the main lobe to be finally received based on the Equations (1) and (2) below.

$$\sin\theta_{pq}\cos\phi_{pq} = \sin\theta_0\cos\phi_0 + p\frac{\lambda}{d_x} \quad \text{Equation (1)}$$

$$\sin\theta_{pq}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, λ indicates a beam wavelength)

The control unit may perform a phase shift through the plurality of phase shifters with respect to the calculated beam directivity angles $\theta_0$ and $\phi_0$ of the main lobe to be output during the transmission and the beam directivity angles $\theta_0$ and $\phi_0$ of the main lobe to be received during the reception and a time delay through the frequency modulation of the signal processor.

The signal processor may include: a transmitting unit that generates the IQ signal and transmits the generated IQ signal to the phase shifter; and a receiving unit that extracts the IQ signal from the signal received from the phase shifter, and the transmitting unit may include: an IQ signal generation unit that generates the IQ signal; a modulation signal generation unit that generates a modulation signal for modulating the frequency of the IQ signal under the control of the control unit; a carrier signal generation unit that generates a carrier signal; and a frequency modulation unit that performs the frequency modulation by combining at least two of the IQ signal, the modulation signal, and the carrier signal received under the control of the control unit.

The control unit may perform the frequency modulation through at least one of performing the frequency modulation by combining the IQ signal and the modulation signal in the frequency modulation unit, performing the frequency modulation by combining the IQ signal and the changed and generated carrier signal in the frequency modulation unit, and performing the frequency modulation by combining the IQ signal multiplied by a sinusoidal function in the frequency modulation unit and the carrier signal.

BRIEF DESCRIPTION OF THE DRAWINGS

FIGS. 2A and 2B are diagrams illustrating an example of a general beam pattern.

FIGS. 3A and 3B are diagrams illustrating an example of a beam pattern according to d/λ.

FIG. 4 is a block diagram schematically illustrating a configuration of a beam steering device according to an embodiment of the present invention.

DETAILED DESCRIPTION OF MAIN ELEMENTS

Figure 1:
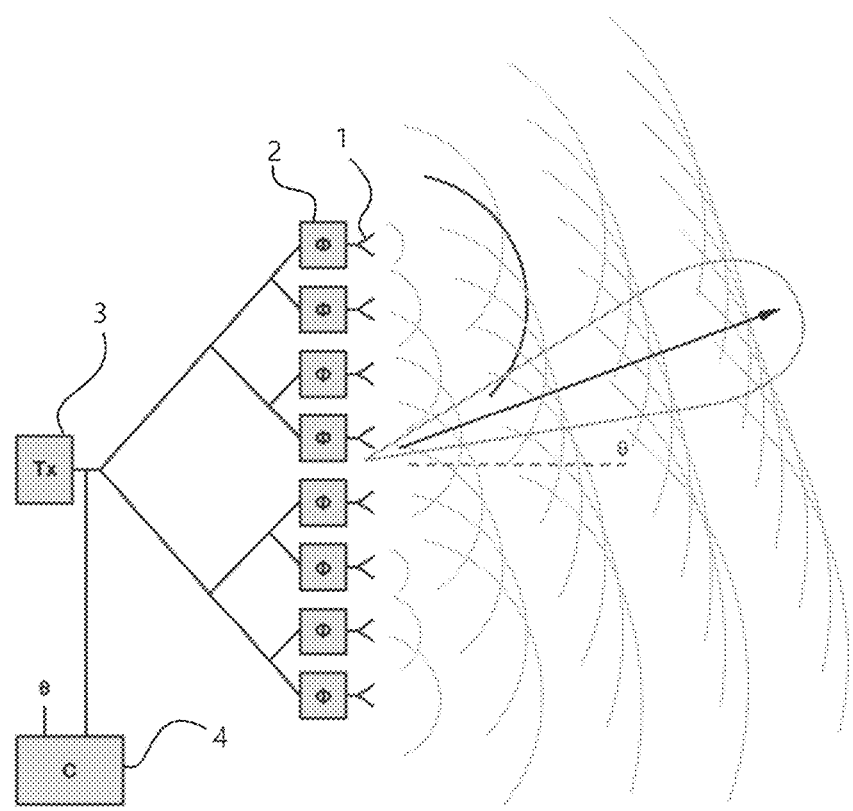
FIG. 1 illustrates a schematic configuration diagram of a conventional phased array antenna.
Figure 2B:
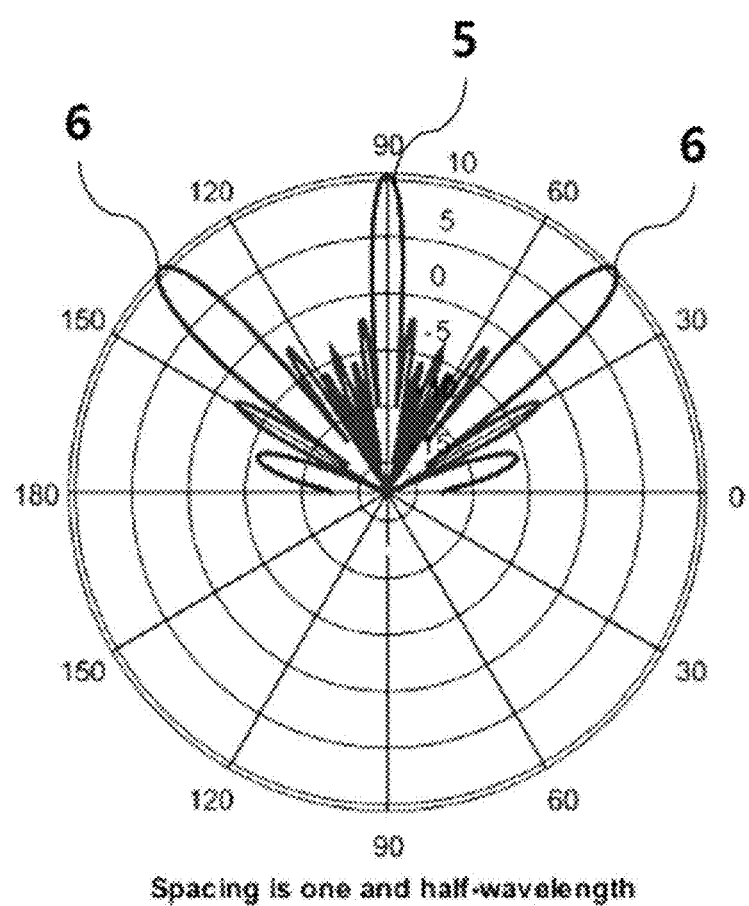
Figure 3B:
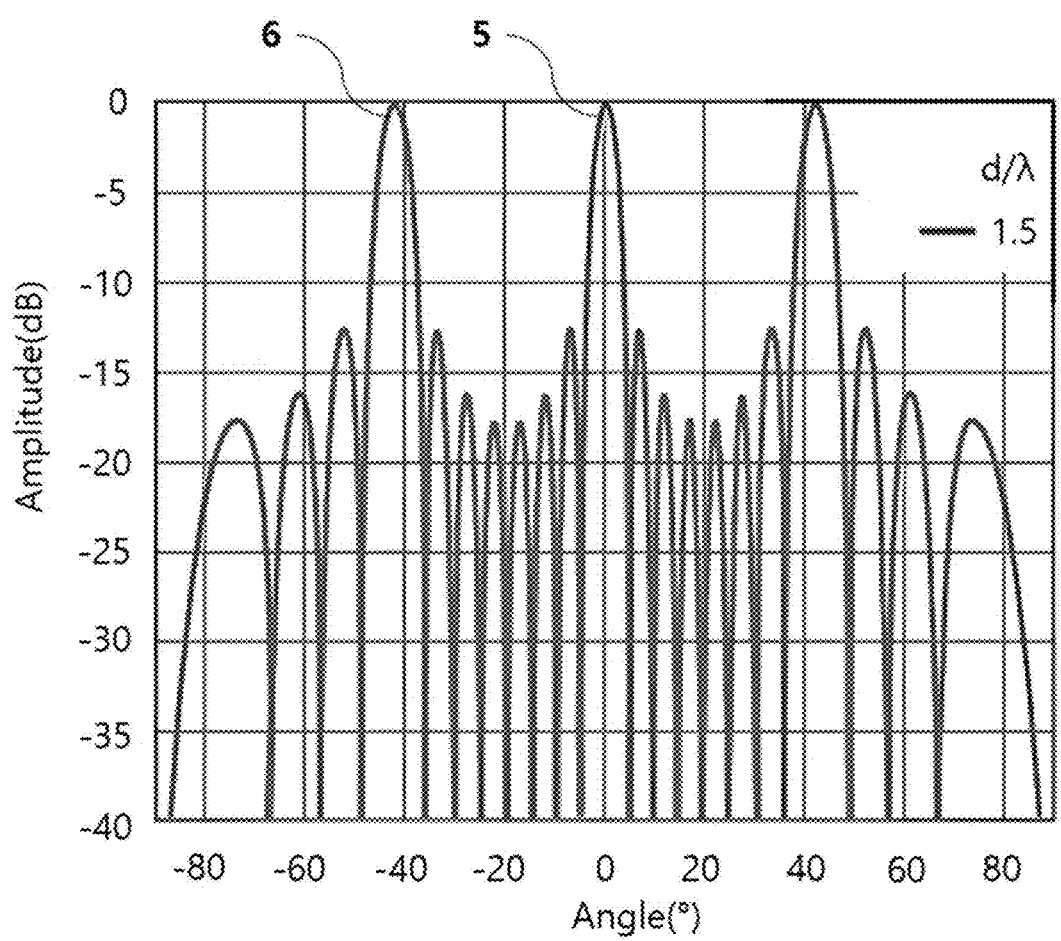

100: Antenna element
200: Phase shifter

300: Signal processor
310: Transmitting unit
311: IQ signal generation unit
312: Modulation signal generation unit
313: Carrier signal generation unit
314: Frequency modulation unit
320: Receiving unit
321: Carrier signal removal unit
322: Modulation signal extraction unit
323: IQ signal extraction unit
324: Frequency modulation unit
400: Control unit
1000: Beam steering device

DETAILED DESCRIPTION OF EMBODIMENTS

In order to explain the present invention and the operational advantages of the present invention and the objects achieved by the practice of the present invention, preferred embodiments of the present invention will be exemplified below and the present invention will be described with reference thereto.

First, the terms used in this application are only used to describe specific embodiments, and are not intended to limit the present invention, and singular expressions may include plural expressions unless the context clearly indicates otherwise. It should be understood that terms "include" or "have" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

In describing exemplary embodiments of the present invention, well-known functions or constructions will not be described in detail since they may unnecessarily obscure the understanding of the present invention.

Figure 5:
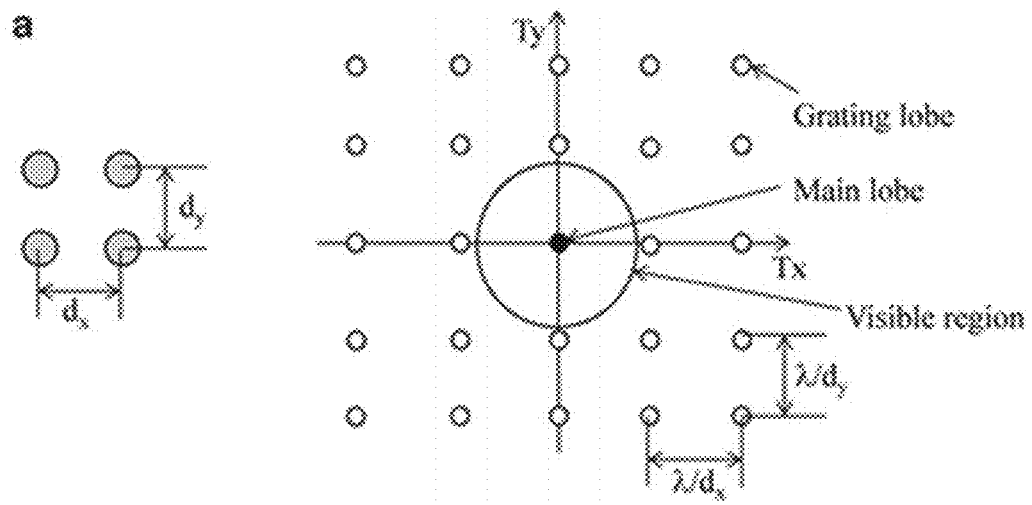
FIG. 5 is a diagram illustrating a grating lobe chart when the array of the antenna elements is a rectangular grid array according to an embodiment of the present invention.
Figure 6:
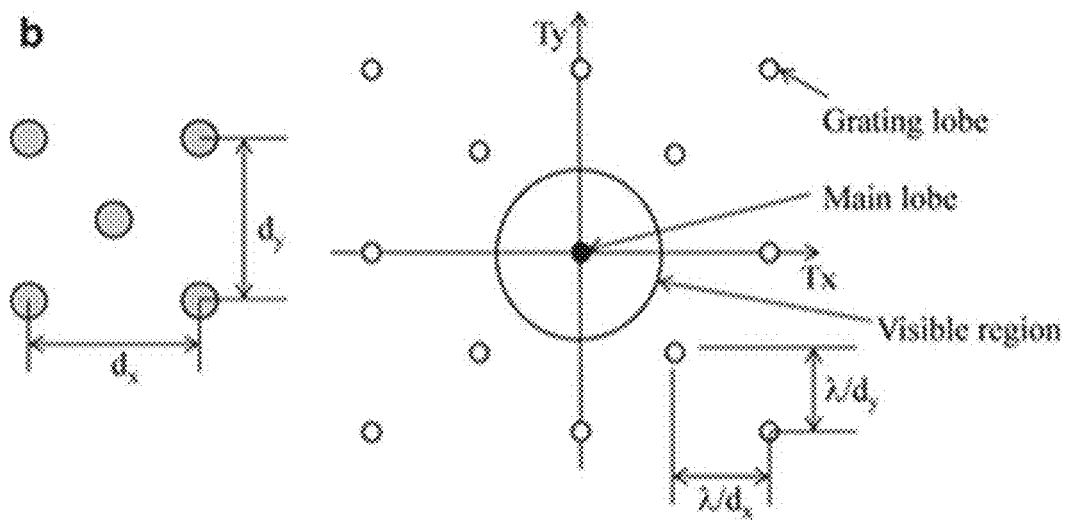
FIG. 6 is a diagram illustrating the grating lobe chart when the array of the antenna elements is a triangular grid array according to an embodiment of the present invention.

FIG. 4 is a block diagram schematically illustrating a configuration of a beam steering device according to an embodiment of the present invention, FIG. 5 is a diagram illustrating a grating lobe chart when the array of the antenna elements is a rectangular grid array according to an embodiment of the present invention, and FIG. 6 is a diagram illustrating the grating lobe chart when the array of the antenna elements is a triangular grid array according to an embodiment of the present invention.

Figure 7:
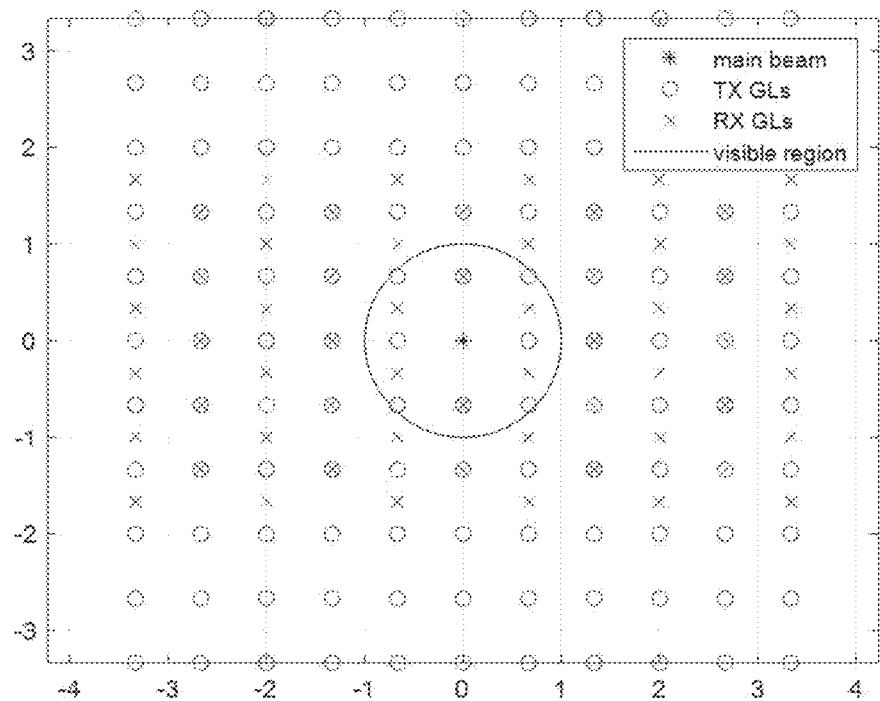
FIG. 7 is a diagram illustrating the main lobe and the grating lobe when the array of the antenna elements is the rectangular grid array during transmission and the array of the antenna elements is the triangular grid array during reception.
Figure 8A:
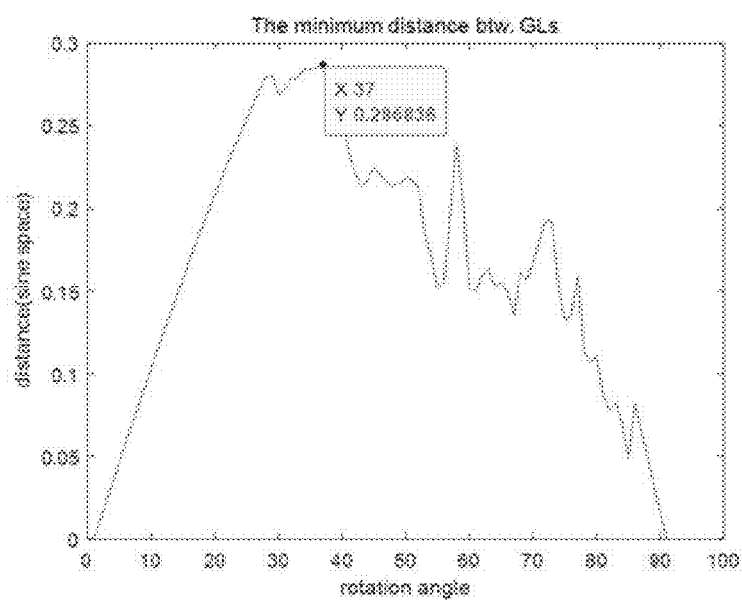
FIGS. 8A and 8B are diagrams illustrating a rotation angle calculation appearance when the array of the plurality of antenna elements is the rectangular grid array during both the transmission and reception according to an embodiment of the present invention.
Figure 8B:
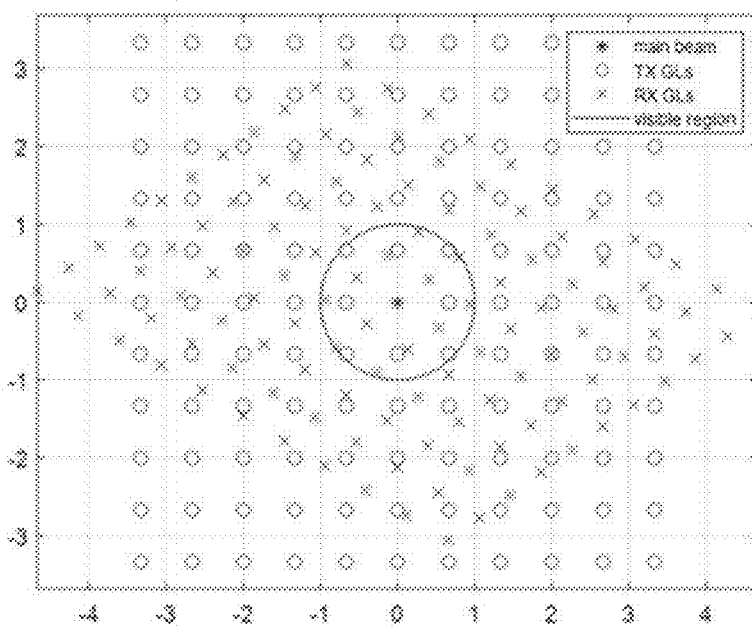

FIG. 7 is a diagram illustrating the main lobe and the grating lobe when the array of the antenna elements is the rectangular grid array during transmission and the array of the antenna elements is the triangular grid array during reception and FIGS. 8A and 8B are diagrams illustrating a rotation angle calculation appearance when the array of the plurality of antenna elements is the rectangular grid array during both the transmission and reception according to an embodiment of the present invention.

Figure 9A:
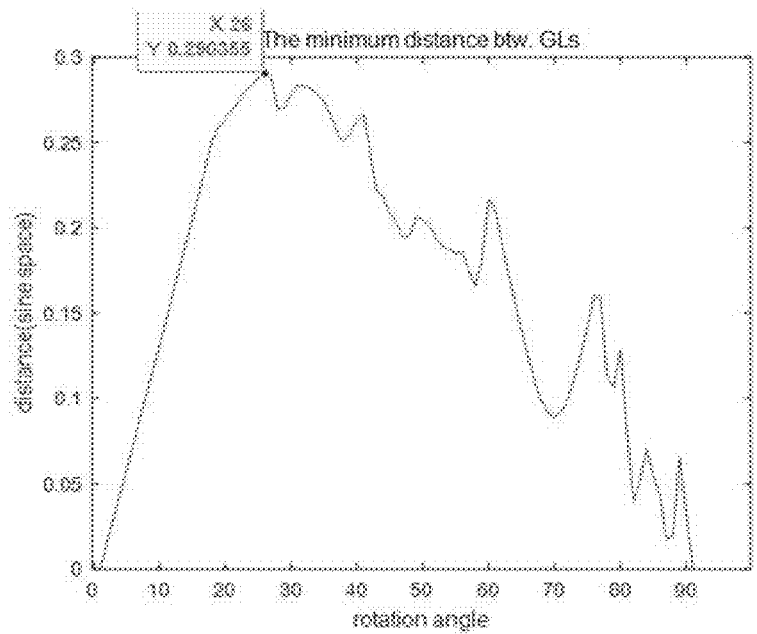
FIGS. 9A and 9B are diagrams illustrating a rotation angle calculation appearance when the array of the plurality of antenna elements is the triangular grid array during both the transmission and reception according to an embodiment of the present invention.
Figure 9B:
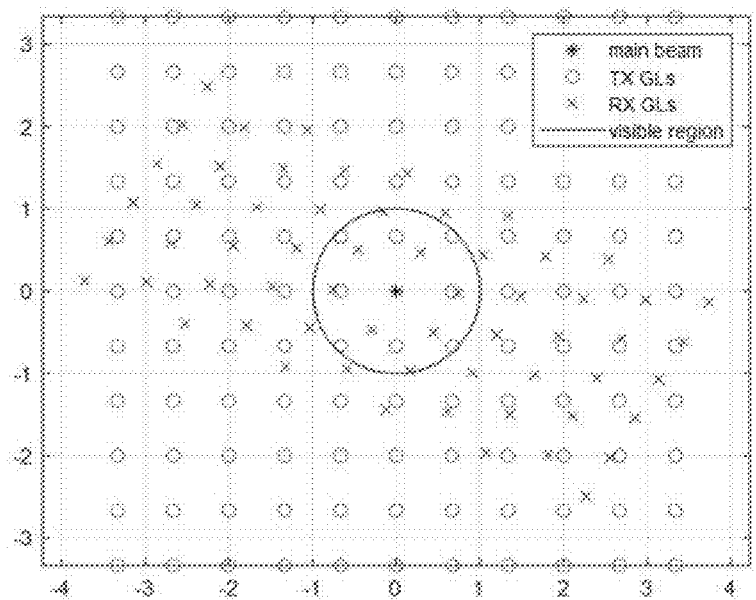
Figure 10A:
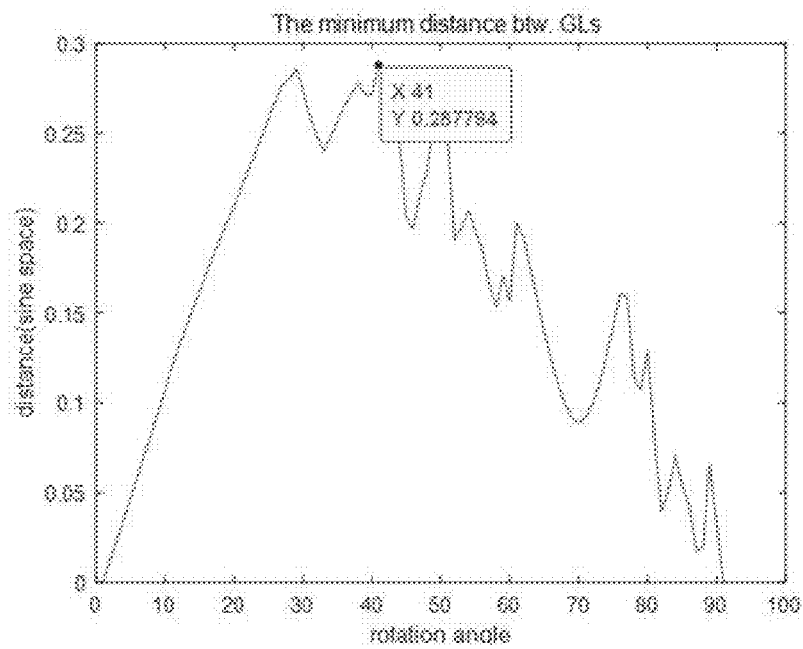
FIGS. 10A and 10B are diagrams illustrating the rotation angle calculation appearances when the array of the plurality of antenna elements is the rectangular grid array during transmission and is the triangular grid array during reception according to an embodiment of the present invention.
Figure 10B:
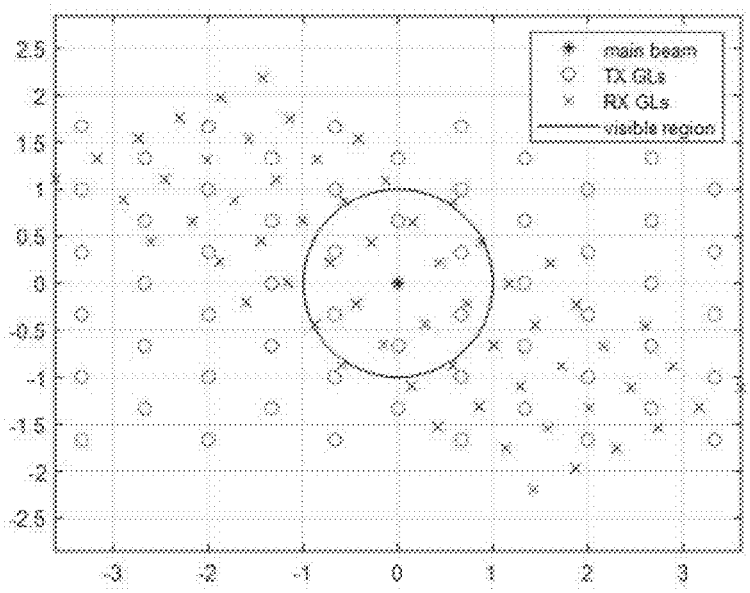
Figure 11:
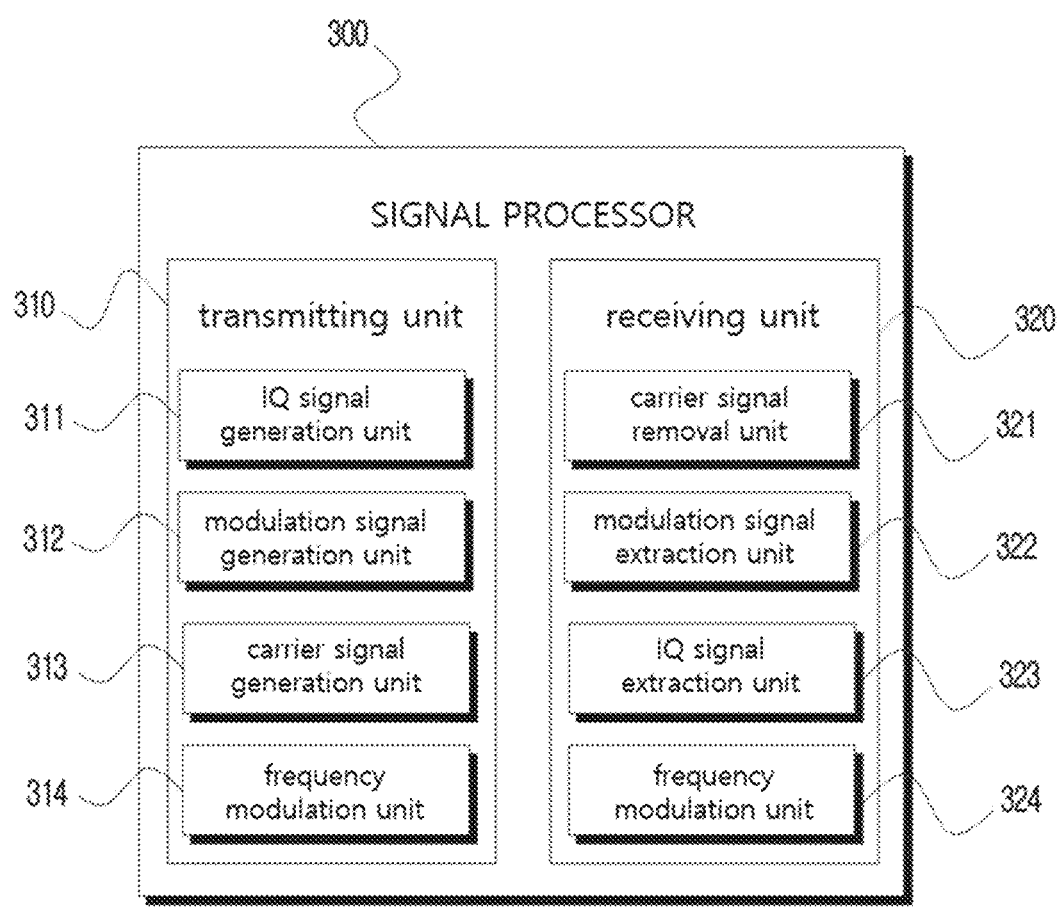
FIG. 11 is a block diagram illustrating a configuration of a signal processor according to an embodiment of the present invention.

FIGS. 9A and 9B are diagrams illustrating a rotation angle calculation appearance when the array of the plurality of antenna elements is the triangular grid array during both the transmission and reception according to an embodiment of the present invention, FIGS. 10A and 10B are diagrams illustrating the rotation angle calculation appearances when the array of the plurality of antenna elements is the rectangular grid array during transmission and is the triangular grid array during reception according to an embodiment of the present invention, and FIG. 11 is a block diagram illustrating a configuration of a signal processor according to an embodiment of the present invention.

Referring to the drawings, a beam steering device 1000 of a phased array antenna according to an embodiment of the present invention includes a plurality of antenna elements 100 that output a received signal to an outside in a predetermined beam direction and receive the signal received from the outside, a plurality of phase shifters 200 each that are connected to the plurality of antenna elements 100 to adjust and output a phase of the signal received by the antenna elements or receive the signal from the antenna elements to adjust and output the phase, a signal processor 300 that generates an IQ signal of a baseband waveform and outputs the generated IQ signal to the phase shifter or extracts the IQ signal from the signal received from the phase shifter, and a control unit 400 that controls the plurality of antenna elements 100, the plurality of phase shifters 200, and the signal processor 300 so that the signal is output or received in a predetermined beam direction.

Here, as illustrated in FIGS. 5 to 10, the antenna elements 100 may be arranged in plural numbers on a two-dimensional plane and may be arranged in a rectangular grid array or a triangular grid array, in which the array of the antenna elements 100 may be configured differently during transmission and reception.

In addition, the phase shifter 200 that shifts the phase of the input signal is connected to each antenna element 100.

The antenna elements 100 receive signals from the phase shifter 200 and output each signal, and the signals output from the plurality of antenna elements 100 cancel or reinforce each other and are output in a predetermined beam direction.

The beam direction is output from the control unit 400 so that a main lobe is formed at a desired azimuth angle φ and elevation angle θ.

The spacing between the antenna elements 100 is set to 1.5λ when λ is the wavelength of the signal output according to an example of the present invention in FIGS. 7 to 10, and it is preferable that the spacing between the antenna elements 100 is configured to be 0.5λ or more.

Meanwhile, when the control unit 400 outputs a beam in a desired direction through the antenna elements 100, the phase shifter 200 adjusts the phases of the signals received from the signal processor 300 to signals having different phase shift values □d' under the control of the control unit 400, and transmits the signals to the antenna elements 100 connected to each of the signals and when receiving the beam, adjusts the phases of the signals received from each antenna element 100 to the signals having different phase shift values □d' under the control of the control unit 400 and transmits the adjusted signals to the signal processor 300 connected to each of the adjusted signals.

The signal processor 300 may be configured to generate the IQ signal of the baseband waveform to transmit the generated IQ signal to the phase shifter 200 or extract the IQ signal from the signal received from the phase shifter 200, and may be configured to include a frequency modulation unit according to settings to modulate an output frequency based on a shift frequency $f_s$ calculated by the control unit 400.

The signal processor 300 includes a transmitting unit 310 that generates the IQ signal and transmits the generated IQ signal to the phase shifter 200, and a receiving unit 320 that extracts the IQ signal from the signal received from the phase shifter 200, in which the transmitting unit 310 may include an IQ signal generation unit 311 that generates the IQ signal, a modulation signal generation unit 312 that generates a modulation signal for modulating the frequency of the IQ signal under the control of the control unit 400, a carrier signal generation unit 313 that generates a carrier signal, and a frequency modulation unit 314 that performs the frequency modulation by combining at least two of the IQ signal, the modulation signal, and the carrier signal received under the control of the control unit 400.

The transmitting unit 310 may include a transmitting unit in the form of digital and a transmitting unit in the form of analog, respectively. The digital transmitting unit transmits a carrier signal (for example, 2.5 GHz) generated from the carrier signal generation unit 313 to a digital waveform synthesizer (DDS), in which the carrier signal is synthesized with the IQ signal generated from the IQ signal generation unit 311, and the synthesized IQ signal is synthesized with the modulation signal generated from the modulation signal generation unit 312 and transmitted to a digital-to-analog converter (DAC) and finally transmitted to the phase shifter 200.

In addition, the IQ signal is a baseband waveform, also called a quadrature signal or a complex signal, and may be composed of two elements, I and Q.

The IQ signal may be defined as a two-dimensional signal whose value at a specific time may be expressed as a single complex number. For example, the I signal and the Q signal may each be formed as a waveform of −225 to 225 MHz, and the modulation signal may be formed as a waveform of 400 to 850 MHz, for example.

Meanwhile, the control unit 400 controls the plurality of antenna elements 100, the plurality of phase shifters 200, and the signal processor 300 so that signals are output or received in a predetermined beam direction. According to an embodiment of the present invention, the control unit 400 sets the array of the plurality of antenna elements during transmission and the array of the plurality of antenna elements during reception to be different from each other so that a grating lobe generated during transmission through the plurality of antenna elements 100 and a grating lobe generated during reception do not overlap each other.

As an example of setting the arrays of the antenna elements to be different from each other, the control unit 400 may configure the array of the antenna elements in a direction rotated at a certain angle from the center of the array of the antenna elements during reception, with respect to the array of the antenna elements during transmission.

That is, as illustrated in FIG. 7, when the array of the antenna elements during transmission is a rectangular grid array and the array of the antenna elements during reception is a triangular grid array, if the array of the antenna elements is not rotated during reception, a "⊗" portion occurs where the position of the grating lobe during transmission and the position of the grating lobe during reception overlap with each other.

Therefore, in an embodiment of the present invention, the array of the antenna elements is rotated during reception so that the grating lobe generated during transmission and the grating lobe generated during reception are generated at the same position and do not overlap each other.

This rotation may be performed in the range of 0° to 90° clockwise from the center of the plurality of antenna elements 100, as illustrated in FIGS. 8A to 10A, respectively. As illustrated in FIGS. 8A and 10A, in the visible region where transmission and reception is possible on the grating lobe chart, the rotation angle at which the relative distance between the grating lobes generated during transmission and the grating lobe generated during reception is the largest may be calculated.

As the relative distance between these grating lobes is the largest, the influence of the grating lobes may be minimized.

Most preferably, the control unit 400 calculates the rotation angle at which the relative distance between the grating lobes is largest, and rotates clockwise with respect to the center of the array of the antenna elements based on the rotation angle when receiving.

In order for the control unit 400 to rotate the array of the plurality of antenna elements, it is preferable that a rotation driving unit (not illustrated) that may rotate the antenna elements 100 at a certain angle with respect to the center is installed on a plane where the antenna elements 100 are installed. As a result, the control unit may control the rotation driving unit to rotate the array of the antenna elements by the rotation angle at which the relative distance between the grating lobes is the largest, as described above.

Looking at the process by which the control unit 400 calculates the rotation angle at which the relative distance between the grating lobes is the largest, first, when the beam directivity angle of the main lobe during transmission is $\theta_0$ and $\phi_0$, the directivity angles $\theta_{pq}$ and $\phi_{pq}$ of the plurality of grating lobes generated during transmission are calculated based on Equations (1) and (2) below.

$$\sin\theta_{pq}\cos\phi_{pq} = \sin\theta_0\cos\phi_0 + p\frac{\lambda}{d_x} \quad \text{Equation (1)}$$

$$\sin\theta_{pq}\sin\phi_{pq} = \sin\theta_0\sin\phi_0 + q\frac{\lambda}{d_y} \quad \text{Equation (2)}$$

(Here, p, q=−n, −(n−1), ..., −1, 0, 1, ..., n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, λ indicates a beam wavelength)

Then, the control unit 400 defines the visible region which can be transmitted and received among the plurality of grating lobes calculated during transmission, and calculates a plurality of grating lobe directivity angles $\theta_{pq}$ and $\phi_{pq}$ with respect to the beam directivity angles $\theta_0$ and $\phi_0$ of all main lobes that can be directed as in the above-described process.

In addition, the control unit 400 sequentially rotates the array of the plurality of antenna elements 100 in a range of 0° to 90° clockwise from the center to calculate the plurality of grating lobes directivity angle $\theta_{pq}$ and $\phi_{pq}$ generated during reception as described above.

In addition, the visible region is defined among the plurality of calculated grating lobes, and the relative distance between the grating lobes during transmission and the grating lobe during reception as described above is calculated.

Accordingly, the largest value is found among the relative distances between the grating lobes during transmission and the grating lobe during reception calculated for each rotation angle, and the rotation angle having the found value is calculated.

The rotation angle having the largest value calculated in this way is 37° in FIG. 8, 41° in FIG. 9, and 26° in FIG. 10.

In addition, in order to calculate the rotation angle having the largest value among the relative distances between the grating lobes during transmission and the grating lobes during reception, when the main beam directivity angle is $\theta_0$ and $\phi_0$ during transmission, the control unit 400 calculates the plurality of $\theta_{pq}$ and $\phi_{pq}$, which are the directivity angles of the grating lobes generated during transmission, based on the above-described Equations (1) and (2), and generates a first grating lobe chart by specifying a visible region capable of transmission.

Then, the control unit 400 rotates the array of the plurality of antenna elements for each predetermined angle from a center during the transmission, calculates the plurality of received grating lobe directivity angles $\theta_{pq}$ and $\phi_{pq}$ with respect to the main beam directivity angles $\theta_0$ and $\phi_0$ for each predetermined angle based on Equations (1) and (2) below, and generates a second grating lobe chart by specifying a receivable visible region.

As a result, the control unit 400 may calculate the rotation angle at which the relative distance between each grating lobe in the visible region of the first grating lob chart and each grating lobe in the visible region of the second grating lob chart is the largest value.

Meanwhile, the control unit 400 may perform a phase shift through the plurality of phase shifters 200 with respect to the calculated beam directivity angles $\theta_0$ and $\phi_0$ of the main lobe to be output during the transmission and the beam directivity angles $\theta_0$ and $\phi_0$ of the main lobe to be received during the reception and a time delay through the frequency modulation of the signal processor 300.

Here, the signal processor 300 includes a transmitting unit 310 that generates the IQ signal and transmits the generated IQ signal to the phase shifter 200, and a receiving unit 320 that extracts the IQ signal from the signal received from the phase shifter 200, in which the transmitting unit 310 may include an IQ signal generation unit 311 that generates the IQ signal, a modulation signal generation unit 312 that generates a modulation signal for modulating the frequency of the IQ signal under the control of the control unit 400, a carrier signal generation unit 313 that generates a carrier signal, and a frequency modulation unit 314 that performs the frequency modulation by combining at least two of the IQ signal, the modulation signal, and the carrier signal received under the control of the control unit 400.

The control unit 400 may perform the frequency modulation through at least one of performing the frequency modulation by combining the IQ signal and the modulation signal in the frequency modulation unit 314, performing the frequency modulation by combining the IQ signal and the changed and generated carrier signal in the frequency modulation unit, and performing the frequency modulation by combining the IQ signal multiplied by a sinusoidal function in the frequency modulation unit and the carrier signal.

Of course, the frequency modulation may be performed through a combination of these according to the setting.

In addition, when the IQ signal is a linear frequency modulation (LFM) signal, the control unit 400 may calculate the phase shift value $\Box d'$ for each phase shifter and the shift frequency $f_s$ of the modulation signal from the LFM signal to perform the time delay.

The process of calculating the phase shift value $\Box d'$ and shift frequency $f_s$ will be described as an example.

The LFM waveform may be represented as follows.

$$s(t)=e^{jwt+jk(t-t_c)^2}$$

Here, a chirp rate k is $$k = \frac{BW}{T_p},$$

and $t_c=T_p/2$.

In addition, the phase delay may be represented as follows.

$$\phi_d = \frac{2\pi}{\lambda}(x_p\sin\theta\cos\phi + y_p\sin\theta\sin\phi)$$

Through this, the time delay may be performed as follows.

$$t_d(n, m) = \frac{1}{c}x_n\cos\theta\sin\phi + y_m\sin\theta\cos\phi$$

$$s_{n,m}(t) = e^{jw(t-t_d)+jk(t-t_d(n,m)-t_c)^2} = e^{jw(t-t_d)+jk(t-(t_d(n,m)+t_c))^2}$$

$$s_{n,m}(t) = e^{jw(t-t_d)+jk(t-(x_n\sin\theta\cos\phi+y_m\sin\theta\sin\phi)/c-t_c)^2}$$
$$= e^{jw(t-t_d)+jkt^2-2jk(t_d+t_c)t+jk(t_d+t_c)^2}$$
$$= e^{jkt^2+j(2-wkt_d-2kt_c)t+jk(t_d+t_c)^2-jwt_d}$$

Therefore, if $t_c=0, s_{n,m}(t)=e^{jkt^2+j(w-2kt_d)t+jkt_d^2-jwt_d}$, and it may be represented as the result of frequency modulation and phase shift.

In addition, the shift angular velocity may be represented as $w_s=-2k(t_d+t_c)$, the shift frequency may be represented as $f_s=-4\pi k(t_d+t_c)$, the total frequency may be represented as $f=f_0+f_s=f_0-4\pi k(t_d+t_c)$, and the shift wavelength may be represented as $$\lambda_s = -\frac{c}{4\pi k(t_d + t_c)}.$$

Therefore, the total frequency may be represented as follows.

$$f = f_0 + f_s = \frac{c}{\lambda} = \frac{c}{\lambda_0} + \frac{c}{\lambda_s} = \frac{c\lambda_s}{\lambda_0\lambda_s} + \frac{c\lambda_0}{\lambda_0\lambda_s} = c\frac{\lambda_0 + \lambda_s}{\lambda_s\lambda_0} = \frac{c}{\frac{\lambda_0\lambda_s}{\lambda_0 + \lambda_s}}$$

In this way, the wavelength is $$\lambda = \frac{\lambda_0\lambda_s}{\lambda_0 + \lambda_s}$$

and is $\phi_d=k(t_d+t_c)^2-wt_d$.

In addition, it may be represented by $s_{n,m}(t)=e^{jkt^2+j(w+w_s)t+j\phi^{d'}}$.

Therefore, in the LFM signal, the phase shift value $\Box_d'$ and the shift frequency $f_s$ may be represented by $\phi_d'=k(t_d+t_c)^2-wt_d$ and $f_s=-4\pi k(t_d+t_c)$.

Accordingly, the control unit 400 may perform the time delay by performing the phase shift and frequency modulation in the phase shifter 200 and the signal processor 300, respectively, using the calculated phase shift value and shift frequency.

In addition, the receiving unit 320 of the signal processor 300 may be configured to include a carrier signal removal unit 321 that removes the carrier signal from the signal received from the phase shifter 200 under the control of the control unit 400, a modulation signal extraction unit 322 that extracts a modulation signal from the received signal, an IQ signal extraction unit 323 that extracts the IQ signal, and a frequency modulation unit 324 that separates at least two of the IQ signal, the modulation signal, and the carrier signal from the signal received from the phase shifter 200 by synchronizing with the frequency modulation of the transmitting unit under the control of the control unit 400.

Regarding the time delay through the phase shift and frequency modulation of the control unit 400, the time delay may be made only through the phase shift when the band of the transmitting and receiving signal is a narrow band, and the phase shift and frequency modulation may be set to be performed simultaneously for a broadband signal when the band of the transmitting and receiving signal is a broad band.

Here, a narrowband signal refers to a case where a bandwidth B occupied by the signal is much smaller than a carrier frequency fc, and a broadband signal refers to a case whether the bandwidth B is similar to or smaller than the carrier frequency.

Meanwhile, a beam steering device 1000 of a phased array antenna according to another embodiment of the present invention includes a plurality of antenna elements 100 each that output a received signal to an outside in a predetermined beam direction and receive the signal received from the outside, a plurality of phase shifters 200 each that are connected to the plurality of antenna elements 100 to adjust and output a phase of the signal received by the antenna elements or receive the signal from the antenna elements 100 to adjust and output the phase, a signal processor 300 that generates an IQ signal of a baseband waveform and outputs the generated IQ signal to the phase shifter 200 or extracts the IQ signal from the signal received from the phase shifter 200, and a control unit 400 that controls the plurality of antenna elements 100, the plurality of phase shifters 200, and the signal processor 300 so that the signal is output or received in a predetermined beam direction.

Here, the control unit 400 sets a beam directivity direction of a main lobe output during transmission to be different from the beam directivity direction of the main lobe during reception so that a grating lobe generated during the transmission through the plurality of antenna elements 100 and a grating lobe generated during the reception do not overlap each other.

To this end, when the plurality of antenna elements 100 are a rectangular grid array, during the transmission, the control unit 400 may display the plurality of generated grating lobe directivity angles θpq and φpq on a grating lobe chart when a beam directivity angle of the main lobe output is θ0 and φ0, and select specific grating lobe positions p and q among the grating lobes displayed on the grating lobe chart to calculate a beam directivity angle of the main lobe to be finally output based on Equations (1) and (2) below, and during the reception, may select the grating lobe positions p and q during the transmission and grating lobe positions −p and −q opposing thereto based on an origin of the grating lobe chart to calculate a beam directivity angle of the main lobe to be finally received based on Equations (1) and (2) below.

$$\sin\theta_{pq}\cos\phi_{pq} = \sin\theta_0\cos\phi_0 + p\frac{\lambda}{d_x} \quad \text{Equation (1)}$$

$$\sin\theta_{pq}\text{a}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, λ indicates a beam wavelength)

When the plurality of antenna elements 100 are a triangular grid array, during the transmission, the control unit 400 may display the plurality of generated grating lobe directivity angles $\theta_{pq}$ and $\phi_{pq}$ on a grating lobe chart when a beam directivity angle of the main lobe output is θ0 and φ0, and select specific grating lobe positions p and q (here, any one of p or q is 0) among the grating lobes displayed on the grating lobe chart to calculate a beam directivity angle of the main lobe to be finally output based on the above-described Equations (1) and (2), and during the reception, select the grating lobe positions during the transmission and grating lobe positions −p and −q (here, any one of p or q is 0) opposing thereto based on an origin of the grating lobe chart to calculate a beam directivity angle of the main lobe to be finally received based on the above-described Equations (1) and (2).

In addition, the control unit 400 may perform a phase shift through the plurality of phase shifters 200 with respect to the calculated beam directivity angles θ0 and φ0 of the main lobe to be output during the transmission and the beam directivity angles θ0 and φ0 of the main lobe to be received during the reception and a time delay through the frequency modulation of the signal processor 300.

Here, the signal processor 300 includes a transmitting unit 310 that generates the IQ signal and transmits the generated IQ signal to the phase shifter 200, and a receiving unit 320 that extracts the IQ signal from the signal received from the phase shifter 200, in which the transmitting unit 310 may include an IQ signal generation unit 311 that generates the IQ signal, a modulation signal generation unit 312 that generates a modulation signal for modulating the frequency of the IQ signal under the control of the control unit 400, a carrier signal generation unit 313 that generates a carrier signal, and a frequency modulation unit 314 that performs the frequency modulation by combining at least two of the IQ signal, the modulation signal, and the carrier signal received under the control of the control unit 400.

The control unit 400 may perform the frequency modulation through at least one of performing the frequency modulation by combining the IQ signal and the modulation signal in the frequency modulation unit 314, performing the frequency modulation by combining the IQ signal and the changed and generated carrier signal in the frequency modulation unit, and performing the frequency modulation by combining the IQ signal multiplied by a sinusoidal function in the frequency modulation unit and the carrier signal.

In addition, the receiving unit 320 of the signal processor 300 may be configured to include a carrier signal removal unit 321 that removes the carrier signal from the signal received from the phase shifter 200 under the control of the control unit 400, a modulation signal extraction unit 322 that extracts a modulation signal from the received signal, an IQ signal extraction unit 323 that extracts the IQ signal, and a frequency modulation unit 324 that separates at least two of the IQ signal, the modulation signal, and the carrier signal from the signal received from the phase shifter 200 by synchronizing with the frequency modulation of the transmitting unit under the control of the control unit 400.

According to the present invention, it is possible to prevent grating lobes or side lobes from overlapping each other by changing an array of antenna elements by rotation during transmission and reception, and minimize an effect of the occurrence of the grating lobes by calculating a rotation angle at which a relative distance between the grating lobes is the greatest.

Although exemplary embodiments of the present disclosure have been described hereinabove, the present disclosure is not limited to the above-mentioned specific exemplary embodiments. That is, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A beam steering device, comprising:
a plurality of antenna elements each that output a received signal to an outside in a predetermined beam direction and receive the signal received from the outside;
a plurality of phase shifters each that are connected to the plurality of antenna elements to adjust and output a phase of the signal received by the antenna elements or receive the signal from the antenna elements to adjust and output the phase;
a signal processor that generates an IQ signal of a baseband waveform and outputs the generated IQ signal to the phase shifter or extracts the IQ signal from the signal received from the phase shifter; and
a control unit that controls the plurality of antenna elements, the plurality of phase shifters, and the signal processor so that the signal is output or received in a predetermined beam direction,
wherein the control unit sets the array of the plurality of antenna elements during transmission and the array of the plurality of antenna elements during reception to be different from each other so that a grating lobe generated during the transmission through the plurality of antenna elements and a grating lobe or a side lobe generated during the reception do not overlap each other.

2. The beam steering device of claim 1, wherein when a main beam directivity angle during the transmission is $\theta_0$ and $\phi_0$, the control unit calculates a plurality of $\theta_{pq}$ and $\phi_{pq}$, which are directivity angles of the grating lobe generated during the transmission, based on Equations (1) and (2) below, generates a first grating lobe chart by specifying a transmittable visible region,
rotates the array of the plurality of antenna elements for each predetermined angle from a center during the transmission, calculates the plurality of received grating lobe directivity angles $\theta_{pq}$ and $\phi_{pq}$ with respect to the main beam directivity angles $\theta_0$ and $\phi_0$ for each predetermined angle based on Equations (1) and (2) below, generates a second grating lobe chart by specifying a receivable visible region, and
calculates an angle at which a relative distance between each grating lobe in the visible region of the first grating lob chart and each grating lobe in the visible region of the second grating lob chart is the greatest $$\sin\theta_{pq}\cos\phi_{pq} = \sin\theta_0\cos\phi_0 + p\frac{\lambda}{d_x} \quad \text{Equation (1)}$$

$$\sin\theta_{pq}\text{a}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, λ indicates a beam wavelength).

3. The beam steering device of claim 2, wherein the array of the plurality of antenna elements is a rectangular grid array or a triangular grid array during both the transmission and reception, or
during the transmission and reception, one is the rectangular grid array and the other is the triangular grid array.

4. The beam steering device of claim 3, wherein when generating the first grating lobe chart and the second grating lobe chart, the control unit calculates the plurality of grating lobe directivity angles $\theta_{pq}$ and $\phi_{pq}$ with respect to the beam directivity angles $\theta_0$ and $\phi_0$ of all main lobes with directivity and calculates the relative distance between the grating lobes in the visible region.

5. The beam steering device of claim 4, wherein the control unit performs a phase shift through the plurality of phase shifters with respect to the calculated beam directivity angles $\theta_0$ and $\phi_0$ of the main lobe to be output during the transmission and the beam directivity angles $\theta_0$ and $\phi_0$ of the main lobe to be received during the reception and a time delay through the frequency modulation of the signal processor.

6. The beam steering device of claim 5, wherein the signal processor includes:
a transmitting unit that generates the IQ signal and transmits the generated IQ signal to the phase shifter; and
a receiving unit that extracts the IQ signal from the signal received from the phase shifter, and
the transmitting unit includes:
an IQ signal generation unit that generates the IQ signal;
a modulation signal generation unit that generates a modulation signal for modulating the frequency of the IQ signal under the control of the control unit;
a carrier signal generation unit that generates a carrier signal; and
a frequency modulation unit that performs the frequency modulation by combining at least two of the IQ signal, the modulation signal, and the carrier signal received under the control of the control unit.

7. The beam steering device of claim 6, wherein the control unit performs the frequency modulation through at least one of performing the frequency modulation by combining the IQ signal and the modulation signal in the frequency modulation unit,
performing the frequency modulation by combining the IQ signal and the changed and generated carrier signal in the frequency modulation unit, and
performing the frequency modulation by combining the IQ signal multiplied by a sinusoidal function in the frequency modulation unit and the carrier signal.

8. A beam steering device, comprising:
a plurality of antenna elements each that output a received signal to an outside in a predetermined beam direction and receive the signal received from the outside;
a plurality of phase shifters each that are connected to the plurality of antenna elements to adjust and output a phase of the signal received by the antenna elements or receive the signal from the antenna elements to adjust and output the phase;
a signal processor that generates an IQ signal of a baseband waveform and outputs the generated IQ signal to the phase shifter or extracts the IQ signal from the signal received from the phase shifter; and a control unit that controls the plurality of antenna elements, the plurality of phase shifters, and the signal processor so that the signal is output or received in a predetermined beam direction, wherein the control unit sets a beam directivity direction of a main lobe output during transmission to be different from the beam directivity direction of the main lobe during reception so that a grating lobe generated during the transmission through the plurality of antenna elements and a grating lobe generated during the reception do not overlap each other.

9. The beam steering device of claim 8, wherein when the plurality of antenna elements are a rectangular grid array, during the transmission, the control unit displays the plurality of generated grating lobe directivity angles $\theta_{pq}$ and $\phi_{pq}$ on a grating lobe chart when a beam directivity angle of the main lobe output is $\theta_0$ and $\phi_0$, and selects specific grating lobe positions p and q among the grating lobes displayed on the grating lobe chart to calculate a beam directivity angle of the main lobe to be finally output based on equations (1) and (2) below, and during the reception, selects the grating lobe positions p and q during the transmission and grating lobe positions −p and −q opposing thereto based on an origin of the grating lobe chart to calculate a beam directivity angle of the main lobe to be finally received based on the Equations (1) and (2) below $$\sin\theta_{pq}\cos\phi_{pq} = \sin\theta_0\cos\phi_0 + p\frac{\lambda}{d_x} \quad \text{Equation (1)}$$

$$\sin\theta_{pq}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, $\lambda$ indicates a beam wavelength).

10. The beam steering device of claim 9, wherein the control unit performs a phase shift through the plurality of phase shifters with respect to the calculated beam directivity angles $\theta_0$ and $\phi_0$ of the main lobe to be output during the transmission and the beam directivity angles $\theta_0$ and $\phi_0$ of the main lobe to be received during the reception and a time delay through the frequency modulation of the signal processor.

11. The beam steering device of claim 8, wherein when the plurality of antenna elements are a triangular grid array, during the transmission, the control unit displays the plurality of generated grating lobe directivity angles $\theta_{pq}$ and $\phi_{pq}$ on a grating lobe chart when a beam directivity angle of the main lobe output is $\theta_0$ and $\phi_0$, and selects specific grating lobe positions p and q (here, any one of p or q is 0) among the grating lobes displayed on the grating lobe chart to calculate the beam directivity angle of the main lobe to be finally output based on equations (1) and (2) below, and during the reception, selects the grating lobe positions during the transmission and grating lobe positions −p and −q (here, any one of p or q is 0) opposing thereto based on an origin of the grating lobe chart to calculate the beam directivity angle of the main lobe to be finally received based on the Equations (1) and (2) below $$\sin\theta_{pq}\cos\phi_{pq} = \sin\theta_0\cos\phi_0 + p\frac{\lambda}{d_x} \quad \text{Equation (1)}$$

$$\sin\theta_{pq}\sin\phi_{pq} = \sin\theta_0\sin\phi_0 + q\frac{\lambda}{d_y} \quad \text{Equation (2)}$$

(Here, p, q=−n, −(n−1), . . . , −1, 0, 1, . . . , n (n is a natural number) (however, p=0 & q=0 are main beams and therefore excluded), dx indicates an x-axis spacing (x-axis antenna element spacing) between the grating lobes in the grating lobe chart, dy indicates a y-axis spacing (y-axis antenna element spacing) between the grating lobes in the grating lobe chart, $\lambda$ indicates a beam wavelength).

12. The beam steering device of claim 11, wherein the control unit performs the phase shift through the plurality of phase shifters with respect to the calculated beam directivity angles $\theta_0$ and $\phi_0$ of the main lobe to be output during the transmission and the beam directivity angles $\theta_0$ and $\phi_0$ of the main lobe to be received during the reception and a time delay through the frequency modulation of the signal processor.

13. The beam steering device of claim 12, wherein the signal processor includes:

a transmitting unit that generates the IQ signal and transmits the generated IQ signal to the phase shifter; and a receiving unit that extracts the IQ signal from the signal received from the phase shifter, and the transmitting unit includes:

an IQ signal generation unit that generates the IQ signal;

a modulation signal generation unit that generates a modulation signal for modulating the frequency of the IQ signal under the control of the control unit;

a carrier signal generation unit that generates a carrier signal; and a frequency modulation unit that performs the frequency modulation by combining at least two of the IQ signal, the modulation signal, and the carrier signal received under the control of the control unit.

14. The beam steering device of claim 13, wherein the control unit performs the frequency modulation through at least one of performing the frequency modulation by combining the IQ signal and the modulation signal in the frequency modulation unit, performing the frequency modulation by combining the IQ signal and the changed and generated carrier signal in the frequency modulation unit, and performing the frequency modulation by combining the IQ signal multiplied by a sinusoidal function in the frequency modulation unit and the carrier signal.

* * * * *